United States Patent
Liu et al.

(10) Patent No.: US 10,585,535 B2
(45) Date of Patent: Mar. 10, 2020

(54) DISPLAY PANEL, DISPLAY DEVICE, AND METHOD FOR FABRICATING DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wei Liu, Beijing (CN); Xue Dong, Beijing (CN); Xiaochuan Chen, Beijing (CN); Haisheng Wang, Beijing (CN); Xiaoliang Ding, Beijing (CN); Shengji Yang, Beijing (CN); Yingming Liu, Beijing (CN); Weijie Zhao, Beijing (CN); Changfeng Li, Beijing (CN); Pengpeng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/540,342

(22) PCT Filed: May 12, 2016

(86) PCT No.: PCT/CN2016/081834
§ 371 (c)(1),
(2) Date: Jun. 28, 2017

(87) PCT Pub. No.: WO2017/166385
PCT Pub. Date: Oct. 5, 2017

(65) Prior Publication Data
US 2018/0299983 A1 Oct. 18, 2018

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 3/0412* (2013.01); *G06F 2203/04103* (2013.01); *G06F 2203/04105* (2013.01)

(58) Field of Classification Search
None
See application file for complete search history.

(56) References Cited

U.S. PATENT DOCUMENTS

2010/0300862 A1* 12/2010 Tamura ................. G06F 3/0412
200/600
2012/0212701 A1 8/2012 Hwang et al.
(Continued)

FOREIGN PATENT DOCUMENTS

CN 104423748 A 3/2015
CN 105068695 A 11/2015
(Continued)

OTHER PUBLICATIONS

Search Report for International Application No. PCT/CN2016/081834 dated Nov. 30, 2016.
(Continued)

*Primary Examiner* — Kenneth B Lee, Jr.
(74) *Attorney, Agent, or Firm* — Calfee, Halter & Griswold LLP

(57) ABSTRACT

A display panel, a display device, and a method for fabricating a display panel are disclosed. The display panel includes a touch member and a display member, both of which include conductive layers. The display panel further includes pressure sensing parts, each of which includes a first electrode and an oppositely arranged second electrode,
(Continued)

and a sensing material layer between the first and second electrodes. The first and second electrodes are respectively arranged in two of the conductive layers which are insulated from each other. The first electrode and the second electrode of each pressure sensing part are respectively arranged in any two conductive layers of the display panel itself which are insulated from each other. This simplifies the fabricating process, and increases the reliability and accuracy for pressure sensing.

9 Claims, 2 Drawing Sheets

(56) References Cited

U.S. PATENT DOCUMENTS

| | | | | |
|---|---|---|---|---|
| 2013/0021295 | A1* | 1/2013 | Kimura | ............... G02F 1/13338 345/174 |
| 2017/0269756 | A1* | 9/2017 | Wang | .................... G06F 3/0414 |
| 2017/0276968 | A1 | 9/2017 | Bai et al. | |
| 2018/0203569 | A1 | 7/2018 | Ding et al. | |

FOREIGN PATENT DOCUMENTS

| | | |
|---|---|---|
| CN | 105117058 A | 12/2015 |
| CN | 105183257 A | 12/2015 |
| CN | 105204223 A | 12/2015 |
| CN | 204926052 U | 12/2015 |
| CN | 204926053 U | 12/2015 |
| CN | 105373228 A | 3/2016 |
| CN | 105446545 A | 3/2016 |
| CN | 105807991 A | 7/2016 |

OTHER PUBLICATIONS

First Office Action for Chinese Patent Application No. 201610201722.2 dated Feb. 26, 2018.

Third Office Action for Chinese Patent Application No. 201610201722.2 dated Jul. 23, 2019.

\* cited by examiner

DISPLAY PANEL, DISPLAY DEVICE, AND METHOD FOR FABRICATING DISPLAY PANEL

RELATED APPLICATIONS

The present application is the U.S. national phase entry of PCT/CN2016/081834, with an international filing date of May 12, 2016, which claims the benefit of Chinese Patent Application 201610201722.2, filed on Mar. 31, 2016, the entire disclosures of which are incorporated herein by reference.

TECHNICAL FIELD

The present disclosure relates to the field of display technology, particularly to a display panel, a display device, and a method for fabricating a display panel.

BACKGROUND

Recently, with the rapid development and application of information technology, wireless mobile telecommunication, and information domestic appliances, information products like a mobile phone, a notebook computer, a multimedia player, and an automatic service terminal have changed the conventional inputting manner by a keyboard or mouse to touching, for the purpose of convenience, compactness, and humanization. A touch display panel generally is divided into a capacitor type, a resistor type, and a photo sensitive type. In all touch display panels, the accuracy for sensing a finger is a key point in design. A pressure sensing technique refers to a technique in which an external force is detected. This technique is used to measure a pressure from the environment or a pressure from a finger of a user, and the result of this pressure measurement is used for adjusting touch function, or for human-computer interactive experience.

The pressure sensing technique is divided into the following types. For example, in a capacitor type pressure detection manner, an electrode layer in the display panel is generally used as a reference, and another electrode layer is formed separately as a sensor. Pressing induces mechanical deformation, and this leads to variation in capacitance between two electrode layers, which is applied to detect pressure. However, the capacitor type pressure detection poses strict requirements for parasitic capacitance parameters of the electrodes, is difficult to realize, and is liable to fail on a dirty surface or in a humid environment. For example, in a piezo-resistant strain manner, pressing induces variation in impedance of a piezo-resistant electrode, which is applied for pressure sensing. Since pressing induces minor variation in impedance of the piezo-resistant electrode, it is difficult to sense and is liable to fail. Meanwhile, the conventional capacitor type pressure detection and piezo-resistant strain detection generally introduce additional a sensing structure (e.g., sensor in the capacitor type pressure detection, or the piezo-resistant electrode in the piezo-resistant strain detection) in a back light module of the liquid crystal display (LCD) or a middle frame of the mobile phone. This kind of design requires to modify the structural design of the display panel. The fitting tolerance is relatively large, which leads to a low pressure sensing accuracy.

SUMMARY

It is an object of the present disclosure to provide a display panel, a display device, and a method for fabricating a display panel, which intends to solve one or more of the problems such as the pressure sensing technique being difficult to realize, being liable to fail, or having a low accuracy.

An exemplary embodiment of the present disclosure provides a display panel, which comprises a touch member and a display member. Both of the touch member and the display member comprise a plurality of conductive layers. The display panel further comprises a plurality of pressure sensing parts. Each of the pressure sensing parts comprises a first electrode and a second electrode which are arranged oppositely, and a sensing material layer which is arranged between the first electrode and the second electrode. The first electrode and the second electrode are respectively arranged in two of the conductive layers which are insulated from each other. In the exemplary embodiment, the first electrode and the second electrode of the pressure sensing part are respectively arranged in any two conductive layers which are insulated from each other and comprised in the display panel itself, it is not required to additionally provide conductive layers for arranging the first electrode and the second electrode. This simplifies the fabricating process. The first electrode and the second electrode are arranged in the display panel, instead of being arranged in the frame of the display panel. This increases reliability and accuracy of pressure sensing.

In an exemplary embodiment, the display member comprises an array substrate and a counter substrate which are arranged oppositely, and the first electrode and the second electrode are respectively arranged in two of the conductive layers of the display member which are insulated from each other. In the exemplary embodiment, the first electrode and the second electrode are arranged in a same layer as different conductive layers of the display member, and this simplifies the fabricating process and reduces cost.

In an exemplary embodiment, the conductive layers of the display member which are arranged on the array substrate comprise a gate conductive layer, a source/drain conductive layer, a pixel electrode layer, and a common electrode layer. The first electrode and the second electrode are respectively arranged in two layers which are selected from the gate conductive layer, the source/drain conductive layer, the pixel electrode layer, and the common electrode layer and which are insulated from each other.

In an exemplary embodiment, the array substrate comprises a base plate, and the gate conductive layer, a gate insulating layer, an active layer, the pixel electrode layer, the source/drain conductive layer, an insulating layer, and the common electrode layer which are formed on the base plate in this order.

In an exemplary embodiment, the second electrode is arranged as a same layer as the source/drain conductive layer, and the first electrode is arranged in the common electrode layer exemplary In an exemplary embodiment, the second electrode is arranged in the gate conductive layer, and the first electrode is arranged in the pixel electrode layer, the source/drain conductive layer, or the common electrode layer.

In an exemplary embodiment, the second electrode is arranged in the pixel electrode layer, and the first electrode is arranged in the common electrode layer.

In an exemplary embodiment, the conductive layers of the display member which are arranged on the array substrate comprise a gate conductive layer, a source/drain conductive layer, a pixel electrode layer, a common electrode layer, and a conductive black matrix layer. The first electrode and the second electrode are respectively arranged in two layers which are selected from the gate conductive layer, the source/drain conductive layer, the pixel electrode layer, the common electrode layer, and the conductive black matrix layer and which are insulated from each other.

In an exemplary embodiment, the array substrate comprises a base plate, and the gate conductive layer, a gate insulating layer, an active layer, the pixel electrode layer, the source/drain conductive layer, an insulating layer, the common electrode layer, first insulating layer, and the conductive black matrix layer which are formed on the base plate in this order.

In an exemplary embodiment, the second electrode is arranged in the source/drain conductive layer, and the first electrode is arranged in the common electrode layer or the conductive black matrix layer.

In an exemplary embodiment, the second electrode is arranged in the gate conductive layer, and the first electrode is arranged in the pixel electrode layer, the source/drain conductive layer, the common electrode layer or the conductive black matrix layer.

In an exemplary embodiment, the second electrode is arranged in the pixel electrode layer, and the first electrode is arranged in the common electrode layer or the conductive black matrix layer.

In an exemplary embodiment, the touch member comprises a sensing conductive layer and a driving conductive layer which are insulated from each other, and the first electrode and the second electrode are respectively arranged in the sensing conductive layer and the driving conductive layer. In the present embodiment, the first electrode and the second electrode are arranged in a same as the respective and different conductive layers of the touch member. This simplifies the fabricating process and reduces cost.

In an exemplary embodiment, the sensing material layer comprises a piezoelectric material.

In an exemplary embodiment, the display panel comprises four pressure sensing parts, which are respectively arranged in regions close to four corners of the display panel. In the present embodiment, the pressure sensing parts are arranged in a non-display region, and thus do not affect an aperture ratio of the display panel.

In an exemplary embodiment, the pressure sensing parts are arranged in a non-display region of the display panel.

The first electrode and the second electrode of each pressure sensing part are respectively arranged in any two conductive layers of the display panel which are insulated from each other. This simplifies the fabricating process. Meanwhile, since the first electrode and the second electrode are not arranged in the frame of the display panel, but in layers inside the display panel, this avoids failure due to effect of the surface or environment of the display panel, and increases the reliability and accuracy for pressure sensing.

On basis of the same inventive concept, an exemplary embodiment of the present disclosure further provides a display device, which comprises the display panel in the above embodiments.

The display panel is provided with a plurality of pressure sensing parts, and the first electrode and the second electrode of each pressure sensing part are respectively arranged in any two conductive layers of the display panel which are insulated from each other. This simplifies the fabricating process. Meanwhile, since the first electrode and the second electrode are not arranged in the frame of the display panel, but in layers inside the display panel, this avoids failure due to effect of the surface or environment of the display panel, and increases the reliability and accuracy for pressure sensing.

An exemplary embodiment of the present disclosure further provides a method for fabricating a display panel, comprising: preparing a plurality of conductive layers of a display member and a touch member of the display panel; and during preparing the conductive layers, arranging a first electrode and a second electrode of each pressure sensing part respectively in two of the conductive layers which are insulated from each other, and arranging a sensing material layer between the first electrode and the second electrode.

The first electrode and the second electrode of each pressure sensing part are respectively arranged in any two conductive layers of the display panel which are insulated from each other. This simplifies the fabricating process. Meanwhile, since the first electrode and the second electrode are not arranged in the frame of the display panel, but in layers inside the display panel, this avoids failure due to effect of the surface or environment of the display panel, and increases the reliability and accuracy for pressure sensing.

DETAILED DESCRIPTION OF EMBODIMENTS

Specific embodiments of the present disclosure will be further described hereinafter with reference to the drawings and embodiments. The following embodiments are only used for explaining more clearly the technical solution of the present disclosure rather than limiting the protection scope of the present disclosure.

Figure 1:
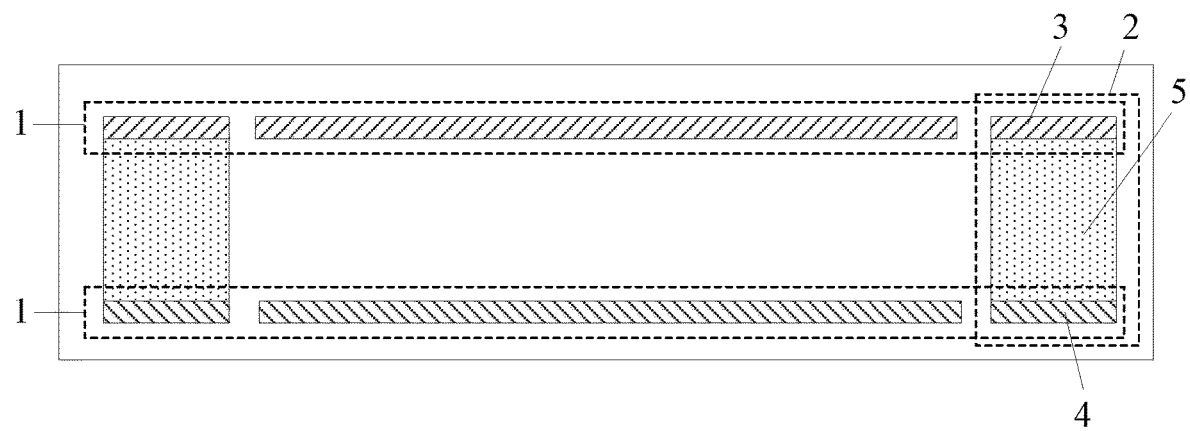
FIG. 1 is a schematic view for illustrating a display panel in an embodiment of the present disclosure.

As shown in FIG. 1, an embodiment of the present disclosure provides a display panel comprising a touch member and a display member. Both the touch member and the display member comprise a plurality of conductive layers 1. The display panel further comprises a plurality of pressure sensing parts 2 which are arranged in a non-display region. Each of the pressure sensing parts 2 comprises a first electrode 3 and a second electrode 4 which are arranged oppositely, and a sensing material layer 5 which is arranged between the first electrode 3 and the second electrode 4. The first electrode 3 and the second electrode 4 are respectively arranged in two of the conductive layers 1 which are insulated from each other.

In the present embodiment, the first electrode 3 and the second electrode 4 of the pressure sensing parts 2 are respectively arranged in any two conductive layers 1 which are insulated from each other of the display panel itself. It is not required to additionally provide conductive layers for arranging the first electrode 3 and the second electrode 4. This simplifies the fabricating process. Besides, the first electrode 3 and the second electrode 4 are arranged in the display panel, instead of being arranged in the frame of the display panel. This increases reliability and accuracy of pressure sensing.

In the present embodiment, both the touch member and the display member comprise a plurality of conductive layers 1, the first electrode 3 and the second electrode 4 are respectively arranged in two of the conductive layers 1 which are insulated from each other of the touch member and the display member. Namely, the first electrode 3, the second electrode 4, and an element electrode for display or touching in respective one of the conductive layers 1 multiplex the conductive layer in which the element electrode is arranged.

For example, the display member of the display panel comprises an array substrate and a counter substrate which are arranged oppositely, and the first electrode 3 and the second electrode 4 are respectively arranged in two conductive layers 1 of the display member which are insulated from each other. In the present embodiment, the first electrode 3 and the second electrode 4 are respectively arranged in different conductive layers 1 of the display member, and this simplifies the fabricating process and reduces cost.

In another example, the touch member of the display panel comprises a sensing conductive layer and a driving conductive layer which are insulated from each other, and the first electrode 3 and the second electrode 4 are arranged in sensing conductive layer and driving conductive layer, respectively. In the present embodiment, the first electrode 3 and the second electrode 4 are arranged in different conductive layers 1 of the touch member, respectively (e.g., the sensing conductive layer and the driving conductive layer), and this simplifies the fabricating process and reduces cost.

In a practical example, the conductive layers 1 which are arranged on the array substrate comprise some or all of a gate conductive layer, a source/drain conductive layer, a pixel electrode layer, a common electrode layer, and a conductive black matrix layer. In an example, the conductive layers 1 on the array substrate comprise a gate conductive layer, a source/drain conductive layer, a pixel electrode layer, and a common electrode layer. The first electrode 3 and the second electrode 4 are respectively arranged in two layers which are selected from the gate conductive layer, the source/drain conductive layer, the pixel electrode layer, and the common electrode layer, and which are insulated from each other. In an exemplary embodiment, the first electrode 3 is arranged in the gate conductive layer, and the second electrode 4 is arranged in the source/drain conductive layer. In an alternative embodiment, the first electrode 3 is arranged in the pixel electrode layer, and the second electrode 4 is arranged in the common electrode layer. In another example, the conductive layers 1 on the array substrate comprise a gate conductive layer, a source/drain conductive layer, a pixel electrode layer, and a conductive black matrix layer. The first electrode 3 and the second electrode 4 are respectively arranged in two layers which are selected from the gate conductive layer, the source/drain conductive layer, the pixel electrode layer, and the conductive black matrix layer, and which are insulated from each other. In an exemplary embodiment, the first electrode 3 is arranged in the pixel electrode layer, and the second electrode 4 is arranged in the conductive black matrix layer.

Embodiments of the present disclosure will be described in detail hereinafter to provide better understanding.

Figure 2:
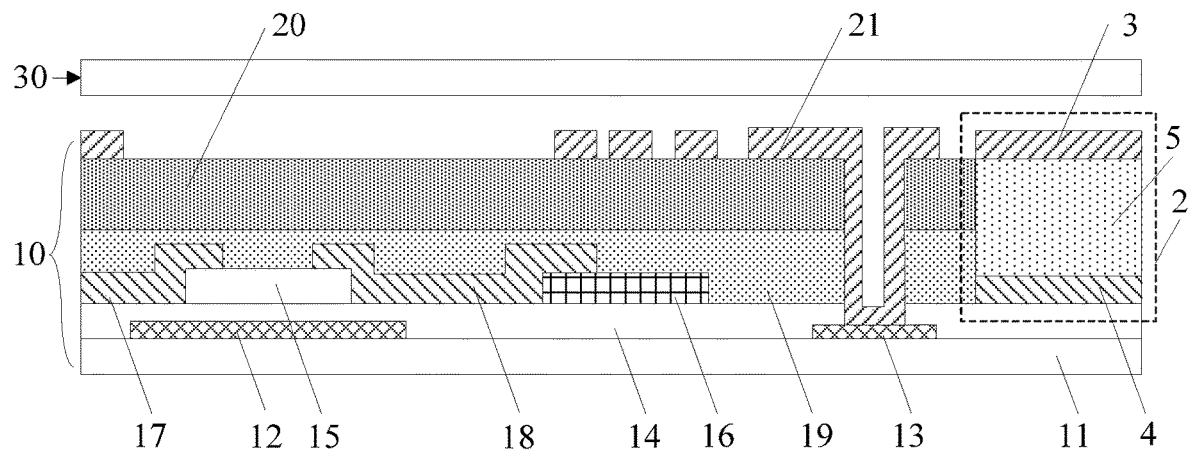
FIG. 2 is a schematic view for illustrating a display panel in an embodiment of the present disclosure.

As shown in FIG. 2, it is provided a display panel, which comprises a touch member (not shown) and a display member (not shown). The display member comprises an array substrate 10 and a counter substrate 30 which are arranged oppositely. The array substrate 10 comprises a base plate 11, as well as a gate conductive layer, a gate insulating layer 14, an active layer 15, a pixel electrode layer, a source/drain conductive layer, a first insulating layer 19, a second insulating layer 20, and a common electrode layer which are formed on the base plate 11 in this order. The gate conductive layer comprises a gate electrode 12 and a common electrode 13. The pixel electrode layer comprises a pixel electrode 16. The source/drain conductive layer comprises a source electrode 17 and a drain electrode 18. The common electrode layer comprises a common electrode 21.

The display panel comprises a plurality of pressure sensing parts 2. The first electrode 3 of each of the pressure sensing parts 2 is arranged in the common electrode layer. Namely, the first electrode 3 and the common electrode 21 multiplex the common electrode layer. The second electrode 4 of each of the pressure sensing parts 2 is arranged in the source/drain conductive layer. Namely, the second electrode 4, the source electrode 17, and the drain electrode 18 multiplex the source/drain conductive layer. The sensing material layer 5 is arranged between the first electrode 3 and the second electrode 4. Of course, in other embodiments, the first electrode 3 and the second electrode 4 are respectively arranged in other layers, which are not repeated here for simplicity.

Figure 3:
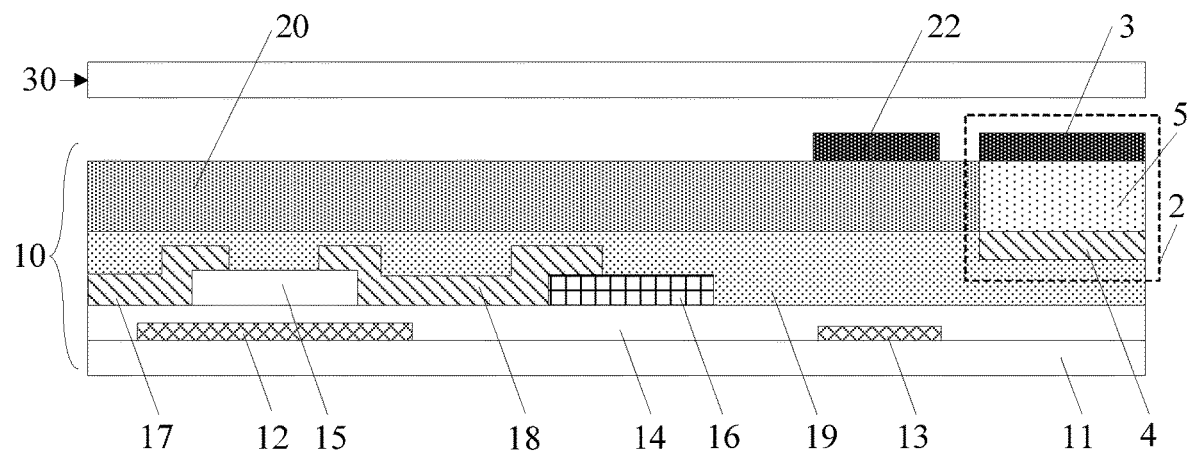
FIG. 3 is a schematic view for illustrating a display panel in an embodiment of the present disclosure.

As shown in FIG. 3, it is provided a display panel, which comprises a touch member (not shown) and a display member (not shown). The display member comprises the array substrate 10 and the counter substrate 30 which are arranged oppositely. The array substrate 10 comprises the base plate 11, as well as a gate conductive layer, the gate insulating layer 14, the active layer 15, a pixel electrode layer, a source/drain conductive layer, the first insulating layer 19, the second insulating layer 20, and a conductive black matrix layer which are formed on the base plate 11 in this order. The gate conductive layer comprises the gate electrode 12 and the common electrode 13. The pixel electrode layer comprises the pixel electrode 16. The source/drain conductive layer comprises the source electrode 17 and the drain electrode 18. The conductive black matrix layer comprises a black matrix 22. For example the conductive black matrix is metallic black matrix.

The display panel is provided with the plurality of pressure sensing parts 2. In each of the pressure sensing parts 2, the first electrode 3 is arranged in the conductive matrix layer. Namely, the first electrode 3 and the black matrix 22 multiplex the conductive matrix layer. In each of the pressure sensing parts 2, the second electrode 4 is arranged in the source/drain conductive layer. Namely, the second electrode 4, the source electrode 17, and the drain electrode 18 multiplex the source/drain conductive layer. The sensing material layer 5 is arranged between the first electrode 3 and the second electrode 4. Of course, in other embodiments, the first electrode 3 and the second electrode 4 are respectively arranged in other layers, which are not repeated here for simplicity.

It is noted that the display panels shown in FIGS. 2-3 are presented merely for purpose of illustration. In implementations, the combination of the display panels shown in FIGS. 2-3 is possible, which is not repeated here for simplicity.

Figure 4:
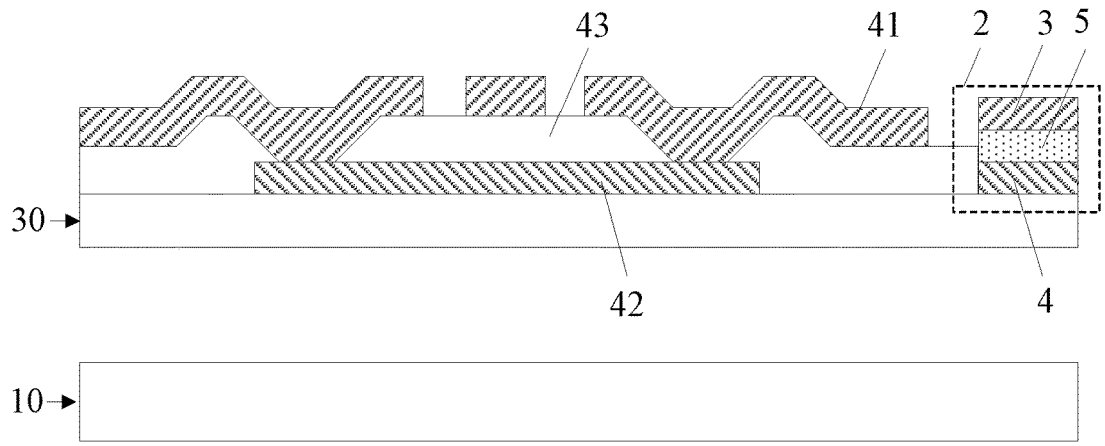
FIG. 4 is a schematic view for illustrating a display panel in an embodiment of the present disclosure.

As shown in FIG. 4, it is provided a display panel, comprising a touch member (not shown) and a display member (not shown). The display member comprises the array substrate 10 and the counter substrate 30 which are arranged oppositely. The touch member comprises a sensing conductive layer and a driving conductive layer. The sensing conductive layer comprises a sensing electrode 41, and the driving conductive layer comprises a driver electrode 42. The driving conductive layer is arranged on the counter substrate 30, and an insulating layer 43 and the sensing conductive layer are arranged on the driving conductive layer in this order. The first electrode 3 is arranged in the sensing conductive layer. Namely, the first electrode 3 and the sensing electrode 41 are arranged in a same layer. The second electrode 4 is arranged in the driving conductive layer. Namely, the second electrode 4 and the driver electrode 42 are arranged in a same layer. In the present embodiment, the first electrode 3 and the second electrode 4 are respectively arranged in different layers of the touch member, and this simplifies the fabricating process and reduces cost.

Figure 5:
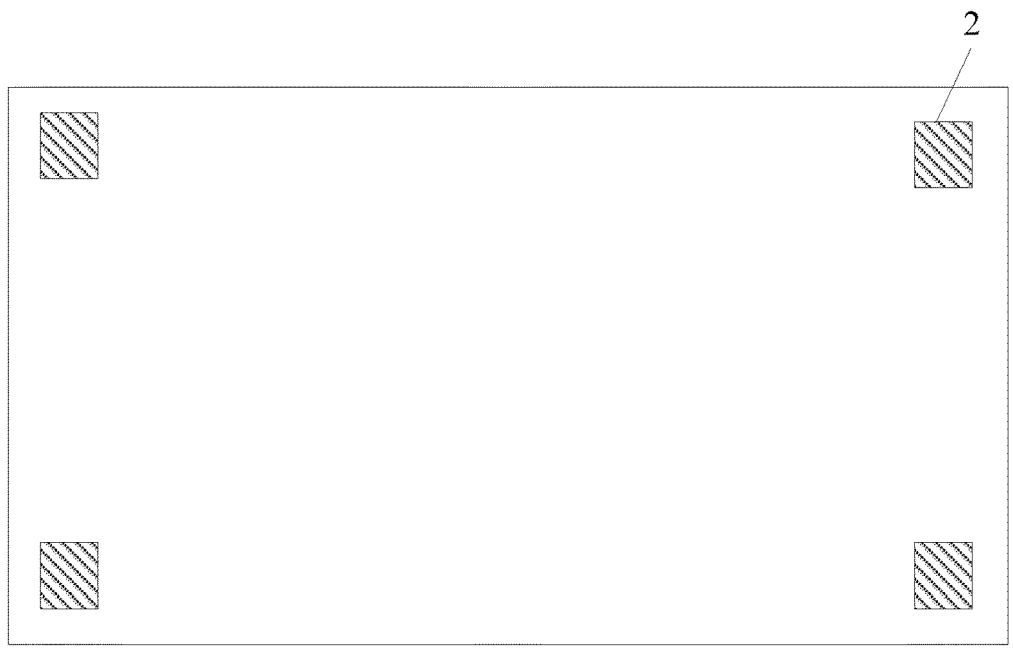
FIG. 5 is a schematic view for illustrating a distribution of pressure sensing parts on a display panel in an embodiment of the present disclosure.

It is noted that in the display panels shown in the above figures, the sensing material layer 5 for example comprises a piezoelectric material. In an embodiment, the pressure sensing parts 2 is arranged in the non-display region of the display panel, in order not to affect the aperture ratio of the display panel. In an embodiment, the display panel comprises four pressure sensing parts 2, which are respectively arranged in regions close to four corners of the display panel, as shown in FIG. 5.

The first electrode and the second electrode of each pressure sensing part are respectively arranged in any two conductive layers of the display panel which are insulated from each other. This simplifies the fabricating process. Furthermore, since the first electrode and the second electrode are not arranged in the frame of the display panel, but in layers inside the display panel, this avoids failure due to effect of the surface or environment of the display panel, and increases the reliability and accuracy for pressure sensing.

On basis of the same inventive concept, an embodiment of the present disclosure further provides a display device, which comprises the display panel described in the above embodiments.

The display panel is provided with a plurality of pressure sensing parts, and the first electrode and the second electrode of each pressure sensing part are respectively arranged in any two conductive layers of the display panel which are insulated from each other. This simplifies the fabricating process. Furthermore, since the first electrode and the second electrode are not arranged in the frame of the display panel, but in layers inside the display panel, this avoids failure due to effect of the surface or environment of the display panel, and increases the reliability and accuracy for pressure sensing.

Figure 6:
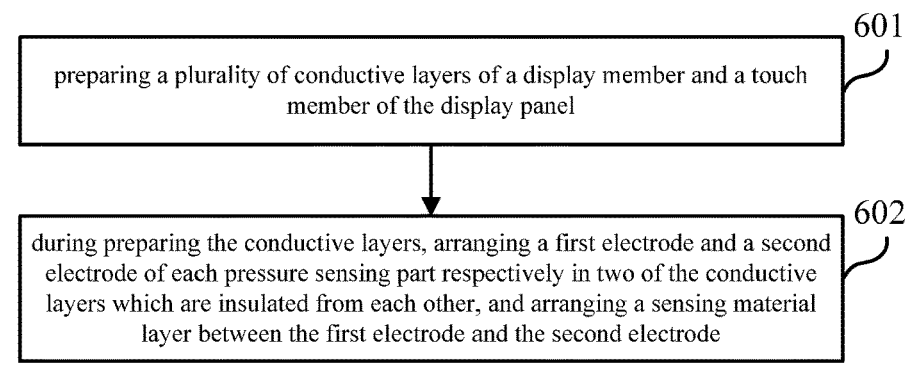
FIG. 6 is a flow chart for illustrating a method for fabricating a display panel in an embodiment of the present disclosure.

As shown in FIG. 6, an embodiment of the present disclosure further provides a method for fabricating a display panel, comprising:

601, preparing a plurality of conductive layers of a display member and a touch member of the display panel; and 602, during preparing the conductive layers, arranging a first electrode and a second electrode of each pressure sensing part respectively in two of the conductive layers which are insulated from each other, and arranging a sensing material layer between the first electrode and the second electrode.

It is noted that step 601 and 602 are not necessarily performed in the above sequence. In practice, the first electrode and the second electrode are arranged in corresponding conductive layers according to design requirements. Thus, these steps shall coincide with the practical sequence of for conductive layers during production, and it is only required that the first electrode and the second electrode are formed synchronously with respect to the corresponding conductive layers.

As shown in FIG. 2, in an embodiment, a method for fabricating a display panel comprises:

step a, forming on a base plate a gate conductive layer comprising the gate electrode 12 and the common electrode 13;

step b, forming on the gate conductive layer the gate insulating layer 14, the active layer 15, and a pixel electrode layer comprising the pixel electrode 16;

step c, forming on the pixel electrode layer a source/drain conductive layer comprising the source electrode 17, the drain electrode 18, and the second electrode 4;

step d, forming the first insulating layer 19 on the source/drain conductive layer;

step e, forming the second insulating layer 20 on the first insulating layer 19;

step f, forming the sensing material layer 5 on the second electrode; and step g, forming a common electrode layer comprising the common electrode 21 and the first electrode 3 on the second insulating layer 20 and the sensing material layer 5.

The method for fabricating a display panel shown in FIGS. 3-4 is similar with the method shown in FIG. 2, which is not repeated here for simplicity.

The first electrode and the second electrode of each of the pressure sensing parts are respectively arranged in any two conductive layers of the display panel itself which are insulated from each other. This simplifies the fabricating process. Since first electrode and second electrode are not arranged in the frame of the display panel, but in layers inside the display panel, this avoids failure due to effect of the surface or environment of the display panel, and increases the reliability and accuracy for pressure sensing.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A display panel comprising: a touch member and a display member, wherein both the touch member and the display member comprise a plurality of conductive layers, wherein the display panel further comprises a plurality of pressure sensing parts, wherein each of the pressure sensing parts comprises a first electrode and a second electrode arranged oppositely from one another, and a sensing material layer arranged between the first electrode and the second electrode, wherein the first electrode and the second electrode are each arranged in two of the conductive layers wherein the two conductive layers are insulated from each other, wherein the display member comprises an array substrate and a counter substrate arranged oppositely from one another, the conductive layers of the display member arranged on the array substrate comprise a conductive black matrix layer, a pixel electrode layer, and a common electrode layer, the first electrode is arranged in a layer in which the conductive black matrix layer is arranged, and the second electrode is arranged in one of a layer in which the pixel electrode layer is arranged and a layer in which the common electrode layer is arranged, and wherein the sensing material layer comprises a piezoelectric material.

2. The display panel of claim 1, wherein the array substrate comprises a base plate, and the gate conductive layer, a gate insulating layer, an active layer, the pixel electrode layer, the source/drain conductive layer, an insulating layer, and the common electrode layer which are formed on the base plate in this order.

3. The display panel of claim 1, wherein the array substrate comprises a base plate, and the gate conductive layer, a gate insulating layer, an active layer, the pixel electrode layer, the source/drain conductive layer, an insulating layer, the common electrode layer, first insulating layer, and the conductive black matrix layer which are formed on the base plate in this order.

4. The display panel of claim 1, wherein the touch member comprises a sensing conductive layer and a driving conductive layer which are insulated from each other, and the first electrode and the second electrode are arranged in the sensing conductive layer and the driving conductive layer.

5. The display panel of claim 1, wherein the display panel comprises four pressure sensing parts arranged in regions close to four corners of the display panel.

6. The display panel of claim 1, wherein the plurality of pressure sensing parts are arranged in a non-display region of the display panel.

7. The display panel of claim 1, wherein the conductive black matrix layer is a metallic black matrix layer.

8. A display device, comprising the display panel of claim 1.

9. A method for fabricating a display panel comprising:

preparing a plurality of conductive layers of a display member and a touch member of the display panel; and during preparing the conductive layers, arranging a first electrode and a second electrode of each pressure sensing part in two of the conductive layers wherein the two conductive layers are insulated from each other, and arranging a sensing material layer comprising a piezoelectric material between the first electrode and the second electrode, wherein the display member comprises an array substrate and a counter substrate arranged oppositely from one another, the conductive layers of the display member arranged on the array substrate comprise a conductive black matrix layer, a pixel electrode layer, and a common electrode layer, the first electrode is arranged in a layer in which the conductive black matrix layer is arranged, and the second electrode is arranged in one of a layer in which the pixel electrode layer is arranged and a layer in which the common electrode layer is arranged.

* * * * *